Figure 2:
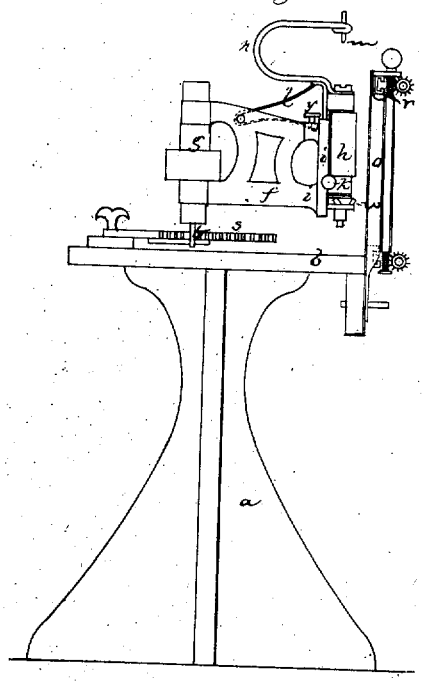

A. S. GEAR.

Improvement in Wood-Molding-Machines.

No. 4,886. Reissued April 30, 1872.

Witnesses
N. Bradford
W. Henderson

A. S. Gear,
by his Attys
Crosby & Gould

UNITED STATES PATENT OFFICE.

ALONZO S. GEAR, OF BOSTON, MASSACHUSETTS.

IMPROVEMENT IN WOOD-MOLDING MACHINES.

Specification forming part of Letters Patent No. 106,685, dated August 23, 1870; reissue No. 4,886, dated April 30, 1872.

*To all whom it may concern:*

Be it known that I, ALONZO S. GEAR, of Boston, in the county of Suffolk and State of Massachusetts, have invented an Improvement in Wood-Molding Machines; and I do hereby declare that the following, taken in connection with the drawing which accompanies and forms part of this specification, is a description of my invention sufficient to enable those skilled in the art to practice it.

This invention relates to improvements in the machine patented to me November 23, 1869, the object being chiefly to adapt the machine to various kinds of work, and particularly to that of carving. The invention consists, first, in combining, with the cutter-shaft, arranged upon a swinging or double-jointed arm, a guide or governing point, arranged so that the movement of the said point over an uneven surface governs the cutter so as to cause a similar surface to be dressed; second, in the construction of a form for paneling or molding purposes of many parts within a single clamp, and also combining a fan with and directly upon the cutter-shaft, constructed and revolving so as to direct a strong current of air on the cutter to throw the chips from the path; third, in making my cutter-spindle vertically movable in its frame, and in so constructing the handles, which in my former invention were used to move the cutter-spindle horizontally, that they serve to aid to raise and lower the cutter-spindle, and are clamps, which, by rotation in one way, are made to clamp the carriage of the spindle to the head of the frame, and in the opposite way to unclamp the same, and in adding a spring to aid the vertical movement of the cutter-spindle.

The drawing represents a machine embodying the improvements.

Figure 1:
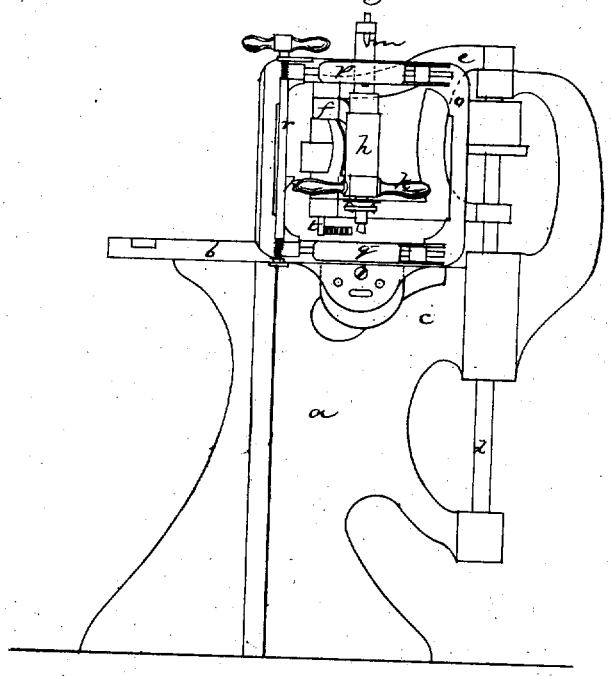
Figure 3:
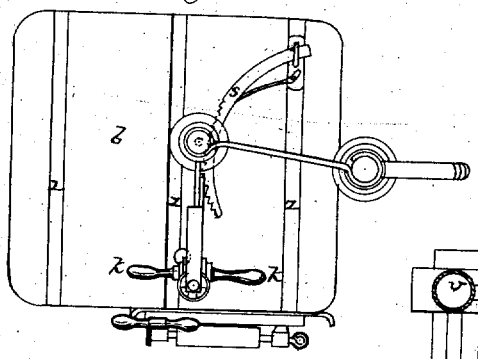
Figure 4:
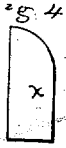
Figure 5:
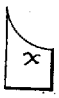
Figure 7:
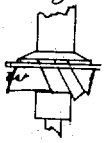
Figure 6:
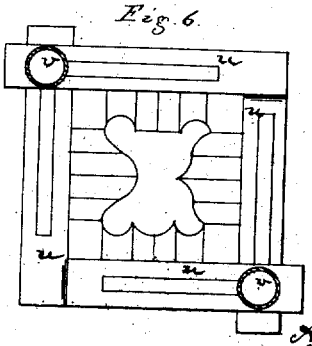
Figure 8:
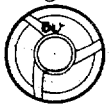

Figure 1 shows a front view of the machine. Fig. 2 is a side elevation. Fig. 3 is a plan of it. Figs. 4 and 5 show two shapes of interchangeable pattern-blocks. Fig. 6 shows the arrangement of such blocks in a pattern-frame. Figs. 7 and 8 show the fan upon the cutter-spindle.

*a* denotes the post or stand; *b*, the table at the top of the same; *c*, the extension of the frame, in which are formed the bearings for supporting the vertical driving-shaft *d*. *e f* are the two arms of the cutter-spindle frame, the arm *e* being jointed to and swinging upon the shaft *d*, while the two arms *e f* are jointed together by and swing upon a vertical shaft, *g*. Instead of making the driving-shaft *d*, and the compound cutter-spindle frame swinging thereon, to move vertically, the shaft is so journaled and supported as only to rotate, and the cutter-spindle is directly supported in a bearing, *h*, which slides vertically in the head *i* of the arm *f*, the downward movement of the spindle being effected and governed by the same handles *k*, which, grasped by the operator, move the spindle laterally. The upward movement of the spindle may be effected by a spring, *l*, the stress of which is preferably just sufficient to raise the spindle and its bearing, when they are free to rise, the spring, by counterbalancing the weight of the spindle and its bearing, rendering it easy for the operator, by a very slight downward pressure upon the handles, to bring the cutter down to its work. Each handle is formed as a clamp-screw, which, by rotation, clamps the spindle-bearing tightly against the head *i*, so that when the cutter is to work laterally or in a horizontal plane it may be secured against movement either up or down by the spindle-bearing being clamped against the cutter-spindle frame. For vertical cutting or the reproduction or copy of surfaces in relief or by carving, I combine, with the swinging cutter-spindle, a vertical pointer or guide-point, *m*, placed in direct axial line with the center of the cutter-spindle, as seen in Fig. 1, said pointer being preferably mounted in the end of a bent or bowing arm, *n*, and adjustable vertically therein, the pattern being so arranged that the pointer can be freely moved over its upwardly-presented surfaces, and the work so arranged that the cutter, by the corresponding movements, (regulated by the position of the pointer,) cuts the face of the work to a surface the fac-simile of the pattern. The pattern and work are preferably mounted in an auxiliary open frame, *o*, attached to the front of the machine, the pattern *p* being clamped in front of the upper rail of said frame, and the work *q* in front of the lower rail thereof, and so that the whole upper surface of the pattern is accessible to the pointer *m*, and the corresponding surface of the work to the cutter, the cutter spindle swinging freely through the frame *o*, and carrying the pointer freely over the surface of the pattern. The pattern may be supported upon two pivots and the work upon two other pivots, and by a suitable index mechanism applied to each pawl, or by a corresponding rotation of both, a change in the position of the upper mandrel and its pattern will bring new surfaces into position to be reached by the pointer, and will cause a reproduction thereof upon the surface of the work.

As shown in the drawing, the two mandrels are simultaneously turned by means of a vertical shaft, *r*, having a worm working into a gear on each mandrel. By inverting the point *m* so as to work against the under side of the pattern *p* a reverse of the form may be produced upon the work. As the cutter is swung from right to left to dress the surface of the block, in order to control the cut I arrange a segmental rack, *s*, (see Figs. 2 and 3,) and fix a dog, *t*, on the lower end of the intermediate shaft, so that as the part *e* is swung around the dog will operate in the teeth of the said rack, as, for instance, starting in the position seen in Fig. 3, as the arm *f* is drawn out the dog will fall into each tooth of the rack; therefore, one cut being taken in one tooth, a second cut may be made in the next tooth, and so on, thus leaving the operator, while the cutter is at work, only to control the swinging of the cutter from right to left.

When used for molding or paneling a form is required, as shown in my original patent; and in order to make an adjustable and variety form I construct several blocks, *x*, say of two different forms, denoted in Figs. 4 and 5, and these blocks I combine within a frame, as seen in Fig. 6, making a variety of forms from the same-shaped blocks, as denoted by the four different sides in Fig. 6. To secure these blocks together I make a universal clamp formed from two L-shaped parts, *u*, slotted and secured together by screws or bolts *v*. By means of the slots the clamp may be extended or contracted, as required, and this form is placed over the work and applied in like manner as in my original machine.

To throw the chips from the cutter it has been usual to direct a wind-pipe onto the cutter to blow the chips away, the wind being supplied independently of the cutter. To do this direct by the cutter-spindle and without additional power, I arrange a fan, *w*, upon the cutter-shaft, directly above the cutter, as seen in Figs. 7 and 8, the blades of the fan being curved so as to direct the air upon the cutter, and with sufficient force to throw the chips therefrom.

In the various parts the cutting operation it is desirable to regulate at times the extent of depth to which the point of the cutter can descend. For this purpose I provide an adjustable stop-pin or screw, *y*, so located and arranged that by setting it higher or lower the downward movement of the cutter-spindle may be limited in accordance with the requirements of the work, or in such manner that the cutting-point can only descend to a predetermined depth.

Figure 9:
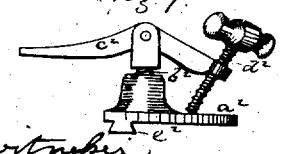

In the top of the table *b* I form a series of parallel grooves or mortises, *z*, preferably dovetailing in form, to receive clamps for holding stock to be paneled, and the slide to which the rack-bar *s* is jointed, and to allow these devices to be moved from place to place upon the table, in accordance with the nature of the work to be effected or the form of the stock. In connection with such grooves I employ a peculiar clamping device, shown at Fig. 9. This clamp is composed of a bearing-stand, $a^2$, in the top of which a vertical pin, $b^2$, is journaled, said pin turning freely in the standard, and having pivoted in its upper end a lever, $c^2$, one end of which forms the clamping-jaw, while through the other end passes a screw, $d^2$, by which the jaw is forced down upon and to clamp the work and pattern together and to the table, the screw working in a nut-thread in the lever and its point bearing against the top of the table. The stand may have a dovetail tenon, $e^2$, for sliding in the table grooves and securing the clamp in place, by resisting the thrust of the screw. By sliding the clamps in the grooves and turning each lever, by means of the rotary pin $b^2$, upon which it is hung, the clamping-jaws may be brought to any position required by the form or size of the work.

I claim—

1. In combination with the swinging-frame, the rotary spindle, and the guide-handles *k*, arranged to move the spindle horizontally and vertically and to clamp it in position on the cutter-spindle frame for lateral action, substantially as described.

2. In combination with the swinging cutter-spindle frame, the toothed segment *s* and dog *t*, substantially as described.

3. The frame *u*, made of slotted L-shaped pieces, clasped together and made adjustable as to size, in combination with the pattern-blocks, substantially as herein described, and for the purpose specified.

4. The fan *w*, fixed upon and rotating with the cutter-spindle, substantially as shown and described.

ALONZO S. GEAR.

Witnesses:
LEANDER E. HAZZARD,
LEONARD W. BRADLEY.